US006809495B2

(12) United States Patent
Rodnunsky (10) Patent No.: US 6,809,495 B2
(45) Date of Patent: Oct. 26, 2004

(54) SYSTEM AND METHOD FOR MOVING OBJECTS WITHIN THREE-DIMENSIONAL SPACE

(75) Inventor: Jim Rodnunsky, Granada Hills, CA (US)

(73) Assignee: Cablecam International Inc., Granada Hills, CA (US)

( * ) Notice: Subject to any disclaimer, the term of this patent is extended or adjusted under 35 U.S.C. 154(b) by 49 days.

(21) Appl. No.: 10/604,525

(22) Filed: Jul. 29, 2003

(65) Prior Publication Data

US 2004/0124803 A1 Jul. 1, 2004

(51) Int. Cl.[7] .............................. B66C 13/08; E04G 3/10
(52) U.S. Cl. ........................ 318/649; 104/180; 212/83; 248/59
(58) Field of Search .......................... 318/649; 104/112, 104/169, 173.1, 180; 212/76, 77, 83, 312, 313; 248/49, 58, 59, 60, 61; 254/264; 348/144, 157; 352/243

(56) References Cited

U.S. PATENT DOCUMENTS

| | | | |
|---|---|---|---|
| 367,610 A | | 5/1887 | Fairman |
| 494,389 A | | 3/1893 | Sherman |
| 578,980 A | | 3/1897 | Eddy |
| 700,321 A | * | 5/1902 | French ................ 212/313 |
| 894,348 A | | 7/1908 | Seele |
| 969,356 A | * | 9/1910 | Fitzgerald ............ 212/313 |
| 1,002,897 A | | 9/1911 | Brown |
| 1,301,967 A | | 4/1919 | Parks |
| 1,634,950 A | | 7/1927 | Lucian |
| 1,729,964 A | * | 10/1929 | Peugh ................. 212/313 |
| 1,731,776 A | | 11/1929 | Henry |
| 1,782,043 A | | 11/1930 | Lawson |
| 1,948,934 A | | 2/1934 | O'Rourke |
| 1,955,770 A | | 4/1934 | Richards |

(List continued on next page.)

FOREIGN PATENT DOCUMENTS

| | | |
|---|---|---|
| AT | 150740 | 9/1937 |
| FR | 992069 | 10/1951 |
| FR | 2318664 | 2/1977 |
| GB | 516185 | 12/1939 |

*Primary Examiner*—Bentsu Ro
(74) *Attorney, Agent, or Firm*—Dalina Law Group P.C.; Joseph J. Mayo (57) ABSTRACT

Embodiments of the invention move objects throughout three-dimensional by using two supporting ropes each of which connects to both opposing sides of the payload. If one rope breaks, the payload gently travels to the middle of the coverage area in a safe manner, maintaining the given displacement in the other unbroken axis. One rope controls the X-axis motion of the platform and is designated the X movement rope. The other rope controls the Y-axis motion of the platform and is designated the Y movement rope. Displacing equal lengths of the X and Y movement ropes allows the Z-axis of the platform to be traversed. There is no need for a complex computer control system since the Z-axis displacement is substantially independent of X and Y axis movement over a coverage area serviced by the platform. In addition, since the ropes are commanded from one point, distantly located motors and electrical cables are not required. Many types of useful devices may then be attached to the platform including devices that require external power or devices that possess their own power and are operated via wireless signals. Triangle and quadrilateral embodiments may be readily constructed without requiring equal distances between any two support structures.

20 Claims, 11 Drawing Sheets

U.S. PATENT DOCUMENTS

| | | |
|---|---|---|
| 2,004,133 A | 6/1935 | Romano |
| 2,055,673 A | 9/1936 | Smile |
| 2,446,096 A | 7/1948 | Moore |
| 2,490,628 A | 9/1949 | Isserstedt |
| 2,523,267 A | 9/1950 | Aschenbrenner et al. |
| 2,899,882 A | 8/1959 | Wylie |
| 3,043,444 A | 7/1962 | Melton |
| 3,065,861 A | 11/1962 | Cruciani |
| 3,094,054 A | 6/1963 | Moors et al. |
| 3,107,791 A | 10/1963 | Michael |
| 3,333,713 A * | 8/1967 | Frido .................... 212/76 |
| 3,638,502 A | 2/1972 | Leavitt et al. |
| 4,017,168 A | 4/1977 | Brown |
| 4,227,479 A | 10/1980 | Gertler et al. |
| 4,331,975 A | 5/1982 | Krawza |
| 4,625,938 A | 12/1986 | Brown .................... 248/550 |
| 4,710,819 A | 12/1987 | Brown |
| 5,440,476 A | 8/1995 | Lefkowitz et al. |
| 5,568,189 A | 10/1996 | Kneller .................... 348/144 |
| 5,585,707 A | 12/1996 | Thompson et al. ...... 318/568.2 |
| 6,566,834 B1 | 5/2003 | Albus et al. ............. 318/568.2 |
| 6,648,102 B2 * | 11/2003 | Bostelman et al. ......... 182/150 |

* cited by examiner

SYSTEM AND METHOD FOR MOVING OBJECTS WITHIN THREE-DIMENSIONAL SPACE

BACKGROUND OF INVENTION

1. Field of the Invention

Embodiments of the invention described herein pertain to the field of aerial cable rail systems. More particularly, these embodiments enable the movement of objects within three-dimensional space.

2. Description of the Related Art

An aerial cable rail system is a system based on an elevated cable or rope, along which objects are transported. Existing cable rail systems have relied on large fixed structures and/or complex control systems in order to facilitate the movement of objects. These systems fail to satisfactorily achieve the full spectrum of ease of control, compact storage, ease of transport, speed, load bearing, volume serviced, extensibility, maintainability and platform stability.

In U.S. Pat. No. 4,625,938, an invention is disclosed in which a camera payload can be moved within three-dimensional space. Since the payload of the invention is reliant on four separate lines, if one of them were to break, a dangerous swinging motion could result since there would be no opposing force to slow down the payload. The invention also requires a computer control system in order to calculate the vectors and change in lengths of the supports ropes in order to move the payload between two points. Therefore, the invention does not provide simple X, Y and Z independence for control purposes.

In U.S. Pat, No. 6,566,834, an invention is disclosed in which a payload can be moved and angularly positioned within three-dimensional space. The invention requires a computer control system in order to calculate the change in lengths of the supports ropes in order to move the payload between two points. The invention appears to require power at the platform and locates the winches for the system on the platform, further reducing the payload capacity of the platform. Furthermore, the invention does not provide simple X, Y and Z independence for control purposes and it appears that complex sensing devices must be deployed in order to keep the cables tensioned properly.

In U.S. Pat, No. 5,585,707, an invention is disclosed in which a robot or person can be readily moved within three-dimensional space. The payload is limited and the support structure is small scale. If the structure were to be scaled up, obstacles such as goal posts or light poles would inhibit the motion of the payload through a path between two points defined within the cube, since there are so many wires required to practice the invention. Also, the invention would not appear to allow the Z-axis to vary beneath the cube, and the size of the cube support structure to service a large volume of space would be extremely expensive to build on the scale required.

In U.S. Pat, No. 5,568,189, an invention is disclosed for moving cameras in three-dimensional space. The problems with the '189 invention become apparent when attempting to enlarge the scale of the system. FIG. 4 clearly shows how the two parallel highline cables sag inward, when the payload is in the middle of the X, Y space. Since the invention does not use strong rails to support the Y-axis rope, the weight bearing of the invention is dependent upon the strength of the building or structure in which it is mounted and the springs in its weight bearing X-axis connectors. The motors for the various axes are mounted up in the rigging, which would require multiple extremely long power cables to traverse the volume of space along with the payload if the invention were modified for outdoor use. The power cables would total over 3 times the length of the longest axis to drive the far X-axis motor, the Y-axis motor and the Z-axis motor. Mounting heavy motors high in the rigging presents a major safety issue given that suspension lines can break. The size of the motors limits the payload that can be carried, and further limits the speed at which the payload can be carried. The invention is also fixed in size, not allowing for modular addition of X travel, or increasing the Y or Z-axis travel without mounting the structure in a bigger studio or building a bigger hanger.

SUMMARY OF INVENTION

Embodiments of the invention move objects throughout three-dimensional space by using two supporting ropes each of which connects to both opposing sides of the payload. If one rope breaks, the payload gently travels to the middle of the coverage area in a safe manner, maintaining the given displacement in the other unbroken axis. One rope controls the X-axis motion of the platform and is designated the X movement rope. The other rope controls the Y-axis motion of the platform and is designated the Y movement rope. Displacing equal lengths of the X and Y movement ropes allows the Z-axis of the platform to be traversed. There is no need for a complex computer control system since the Z-axis displacement is substantially independent of X and Y axis movement over a coverage area serviced by the platform. In addition, since the ropes are commanded from one point, distantly located motors and electrical cables are not required. Many types of useful devices may then be attached to the platform including devices that require external power or devices that possess their own power and are operated via wireless signals. Triangle and quadrilateral embodiments may be readily constructed without requiring equal distances between any two support structures.

Creating a three axis movement configuration from only two ropes driven from a point distantly located from the payload is non-trivial, but provides advantages of allowing the motors to be large, power cables to be short and located near a large generator and control computer. Maintenance is readily performed in one location. The Z-axis may also contain a pulley arrangement that multiplies the Z-axis travel.

The system is configured to move objects across any axis by using motors mounted at one support point, on or near the ground, to drive the ropes. These motors connect to a generator that can be as large as the application requires in order to achieve the required payload speed. The sheaves employed in the system may contain high speed bearings and are may be configured to capture the rope in order to prevent derailing in order to add a degree of safety to the system. The drive pulleys attached to the motors comprise grooves that grip the rope in order to prevent slippage. Any known means of driving rope may be substituted for grooved pulleys.

For the purposes of this disclosure the use of the word motor signifies a motor connected to a drive pulley or drum winch. This assumption is made for purposes of illustration since it is well known in the art that the motor must drive any of a number of attachments to actually engage rope.

The system can be scaled to any size by employing longer ropes and moving the attachment points. Embodiments may be configured in scalene triangle or convex or concave quadrilateral arrangements where no two sides are required to have the same length.

DETAILED DESCRIPTION

Embodiments of the invention move objects throughout three-dimensional by using two supporting ropes. Each rope connects to both opposing sides of the payload and since there are two ropes, all four sides of the payload are coupled to the two ropes. If one rope breaks, the payload gently travels to the middle of the coverage area in a safe manner, maintaining the given displacement in the other unbroken axis. Motors driving the ropes may comprise stepping motors, or standard motors with brake systems in order to lock motion when the motors have stopped rotating. Any type of device that can move rope can be used in place of a motor. One rope controls the X-axis motion of the payload, while the other rope controls the Y-axis motion of the payload. Feeding equal lengths of rope into the X-axis and Y-axis ropes allows the Z-axis of the payload to be traversed. There is no need for a complex computer control system since the Z-axis displacement is substantially independent of X and Y axis movement over a coverage area meaning that as the platform carrying the payload moves to the middle of the area of coverage in X and Y space, the Z-axis displacement is the deepest. As the platform moves towards a support structure, the Z-axis displacement is the highest. This gradual displacement in the middle of the coverage area makes embodiments well suited to stadium use and strip mining use and provides a built in safety measure. In addition, by feeding equal lengths of rope into the X-axis and Y-axis ropes, the platform can be moved in X and Y space while maintaining a constant Z-axis position manually or with a simple controller. In addition, since the ropes are commanded from one point, distantly located motors and electrical cables are not required. Many types of useful devices may then be attached to the platform including devices that require external power or devices that possess their own power and are operated via wireless signals. Triangle and quadrilateral embodiments may be readily constructed without requiring equal distances between any two support structures.

Figure 1:
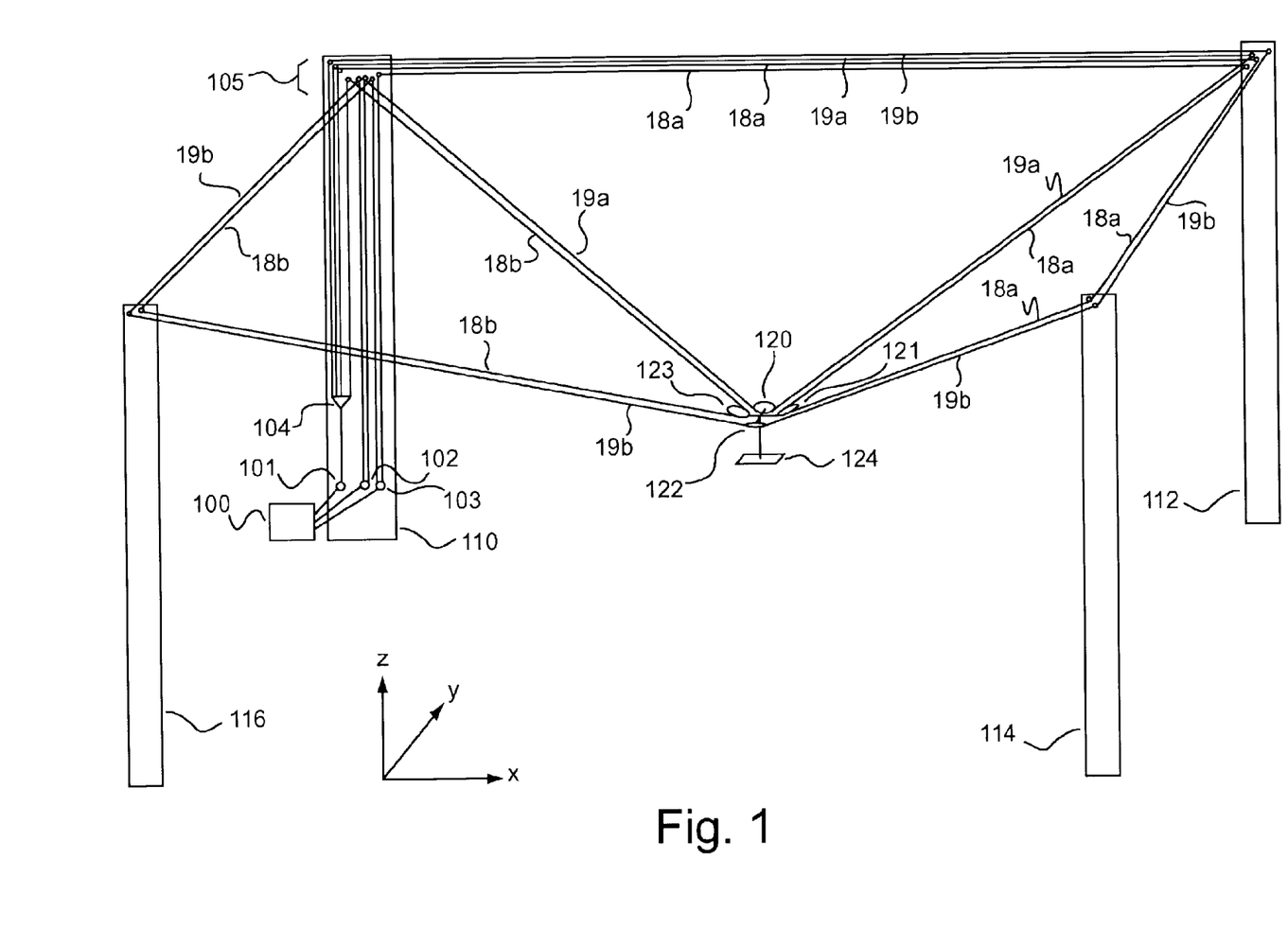
FIG. 1 is a perspective view of the overall system.

FIG. 1 shows a perspective view of an embodiment of the system. The three axis are shown in the figure with the X-axis shown left to right, the Y-axis shown into the page and the Z-axis shown bottom to top of the page. In this configuration, support structures 110, 112, 114 and 116 separate platform 124 from the ground. Platform 124 provides a mobile attachment point for cameras, mining scoops, logging hooks, or any other utility enabling device applicable to any industry.

Platform 124 is supported and is moved in three dimensions by two ropes. Each of the ropes forms a pair of "V" shapes when viewed from above, on opposing sides of platform 124 when platform 124 is centered within the system. Both X motion rope and Y motion rope have the same length. By decreasing the length of each of the two ropes deployed into the system via Z-axis motor 101 and Z movement device 104, platform 124 is raised. Conversely, increasing the length of each of the two ropes deployed, platform 124 is lowered. The rope on the right side of X-axis motor 103 is designated 18a while the rope on the left side of X-axis motor 103 is designated 18b. X movement rope sides 18a and 18b are different sides of the same piece of rope where the designation changes at the motor. The rope on the right side of Y-axis motor 102 is designated 19a while the rope on the left side of Y-axis motor 102 is designated 19b. Y movement rope sides 19a and 19b are different sides of the same piece of rope. Therefore, rope designations beginning with 18 signify the X movement rope and rope designations beginning with 19 signify Y movement rope. Control of X, Y and Z-axis motors can be in the form of simple switches, or a computer system that takes into account the position of the platform in order to adjust Z-axis traversal to keep platform 124 at the same Z position while traversing the X and Y axis.

Z movement device 104 is coupled to opposing ends of X movement rope, side 18a and side 18b and opposing ends of Y movement rope, side 19a and side 19b. Sheave 120 is coupled to Y movement rope side 19a. Sheave 122 is coupled to Y movement rope side 19b. Sheave 121 is coupled to X movement rope side 18a and sheave 123 is coupled to X movement rope side 18b. By rotating X-axis motor 103, thereby decreasing the amount of rope on X movement rope side 18a, which increases the amount of rope on X movement side 18b, the platform moves in the positive X direction, to the right in the figure. By rotating Y-axis motor 102, thereby decreasing the amount of rope on Y movement rope side 19a, which increases the amount of rope on Y movement side 19b, the platform moves in the positive Y direction, into the figure.

Figure 10:
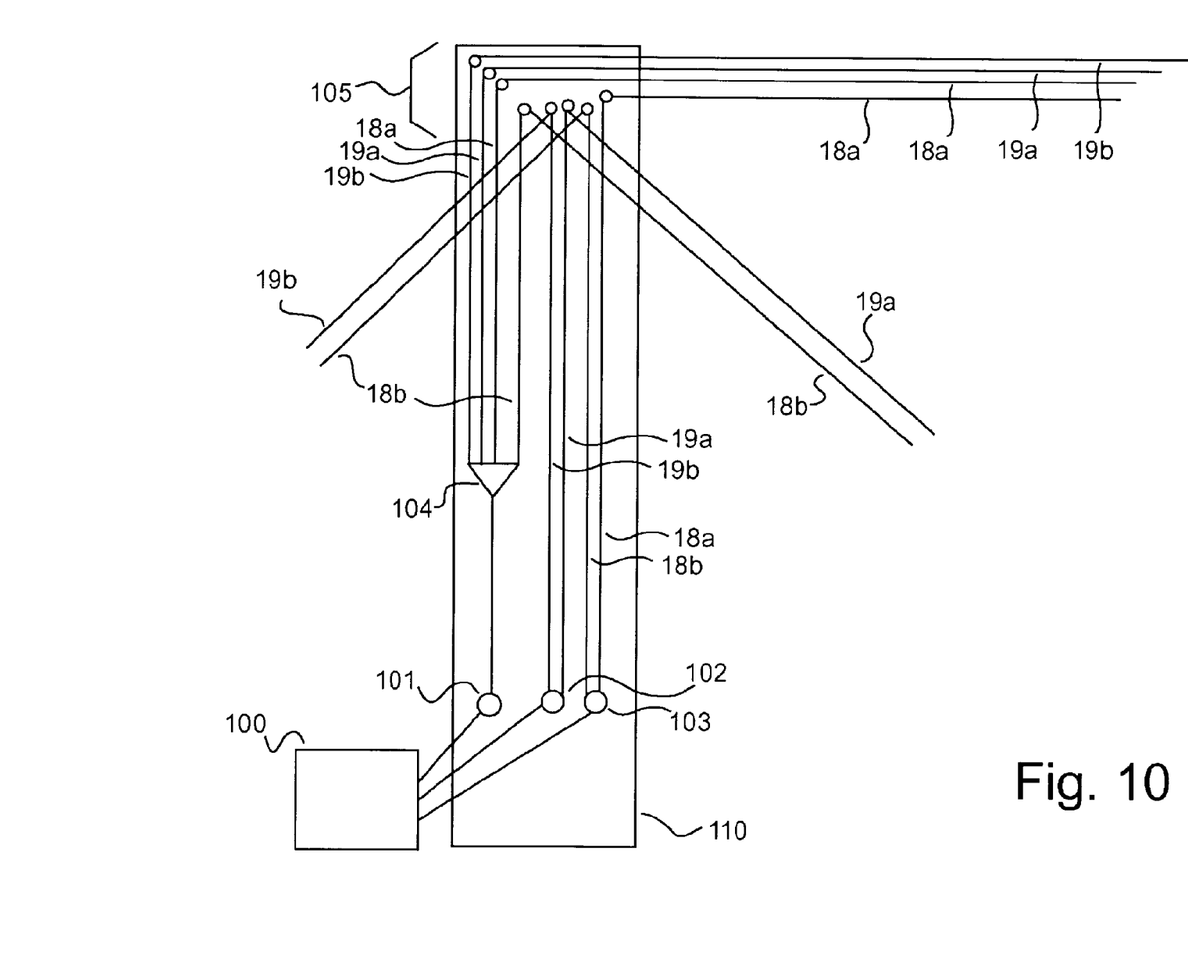
FIG. 10 is a close up view of the reeving within the sheave assembly and main support structure.

FIG. 10 shows the reeving of support structure 110 and sheave assembly 105 detailed with every rope coupled to it. As this is a logical pattern for purposes of illustration, one skilled in the art will recognize that the various sheaves may be rearranged and realigned to minimize the space taken up by sheave assembly 105.

Generator and electronic drive units 100 power Z-axis motor 101, X-axis motor 103 and Y-axis motor 102. Z-axis motor 101 drives a drum winch that shortens or lengthens the amount of rope up to Z movement device 104. For the purposes of this disclosure and ease of illustration it is not shown. X-axis motor 103 and Y-axis motor 102 drive pulleys, also not shown for ease of illustration. Drive pulleys and drum winches are well known in the art and embodiments that minimize rope wear and provide anti-derailing features may be interchanged to drive the rope in the system.

An embodiment of the invention can run fiber optics cables or power cables along X movement rope side 18b or Y movement rope side 19a from support structure 110 to platform 124. Support structures 112, 114 and 116 can alternatively supply power to the platform via identical means. Platform 124 may alternatively house devices with collocated power supplies negating the need for external power cables. Devices attached to platform 124 may include wireless or other remote controlled devices.

Figure 2:
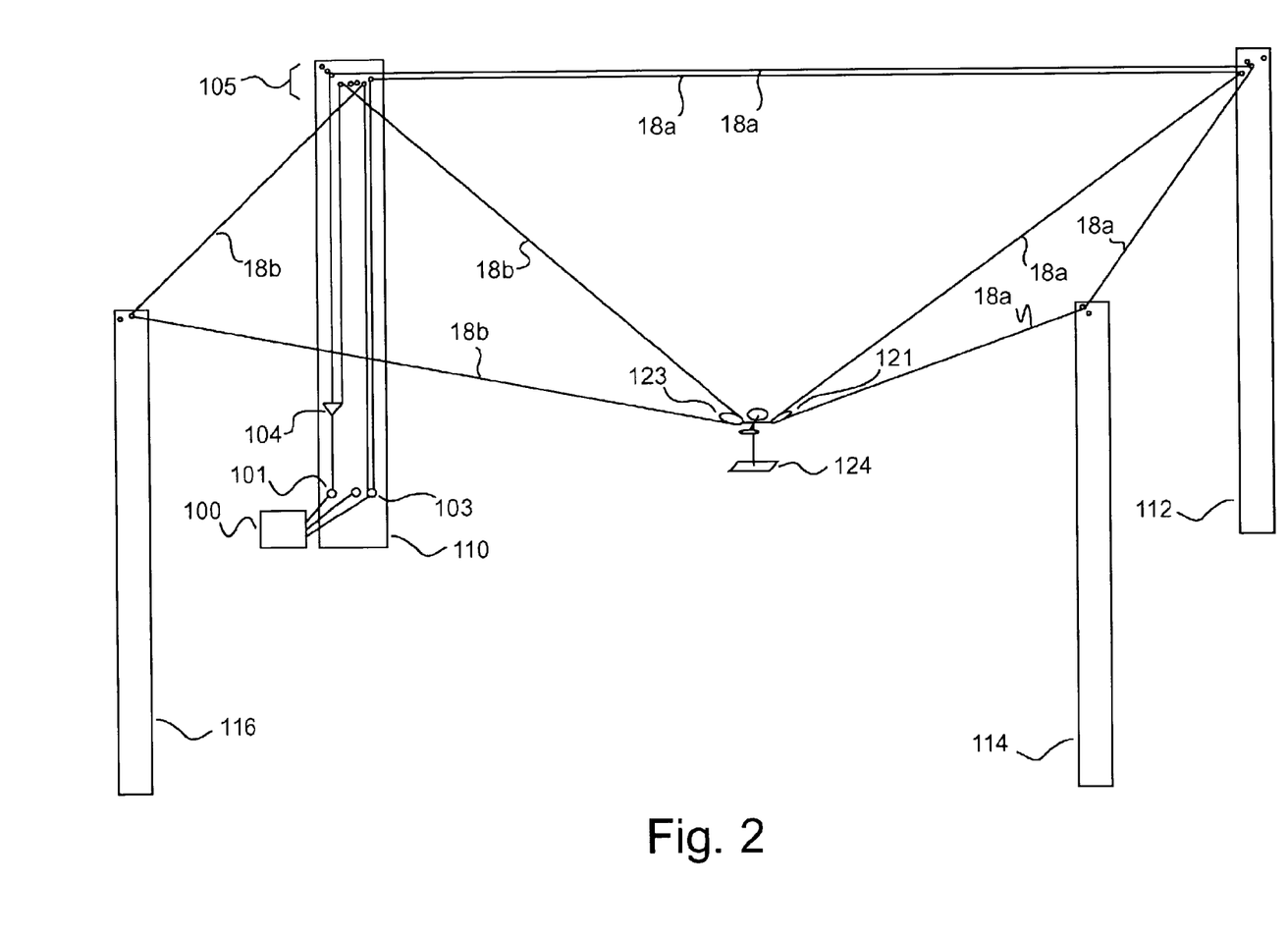
FIG. 2 is a perspective view of the X-axis reeving.

FIG. 2 shows the X-axis reeving. X movement in the positive X direction, to the right in the figure, is accomplished by rotating X-axis motor 103 clockwise in the diagram. As X-axis motor 103 rotates clockwise, rope 18a moves down support structure 110 from sheave assembly 105 from support structure 112 and hence out of sheave 121. Although both ropes shown between support structures 110 and 112 are designated 18a, they are indeed the same rope, although the top rope only moves during Z-axis traversal. As the rope leaves sheave 121 to support structure 112, it pulls platform 124 to the right in the positive X-axis direction. At the same time, X movement rope side 18b flows upward from X-axis motor 103 to sheave assembly 105 to support structure 116 and into sheave 123. Since the length of X movement rope side 18a on the right side of platform 124 is decreasing in length while the length of X movement rope side 18b on the left side of platform 124 is increasing, the platform moves to the right, in the positive X-axis direction. The converse applies for motion in the negative X-axis direction by rotation X-axis motor 103 in the other direction.

Unwinding rope attached between Z-axis motor 101 and Z movement device 104 increases the length of deployed rope in X movement rope sides 18a and 18b. This lowers the platform in the Z-axis direction. As Z movement device 104 rises, X movement rope side 18a moves upward into sheave assembly 105 to support structure 112, to support structure 114 and into sheave 121. At the same time, X movement rope side 18b, also attached to Z movement device 104 moves upward into sheave assembly 105 and into sheave 123. Since both sides of platform 124 have increased rope length, the platform lowers. Pulling down on Z movement device 104 conversely raises platform 124.

Note that Z movement device 104 can comprise a sequence of pulleys for multiplying the Z-axis traversal, and may also utilize a block or other device for disabling travel in case of rope breakage between Z-axis motor 101 and Z movement device 104. By placing a backup means of limiting the upward travel of Z movement device 104 the platform can be configured to never reach the ground beneath it even if a failure beneath Z movement device were to occur.

Figure 3:
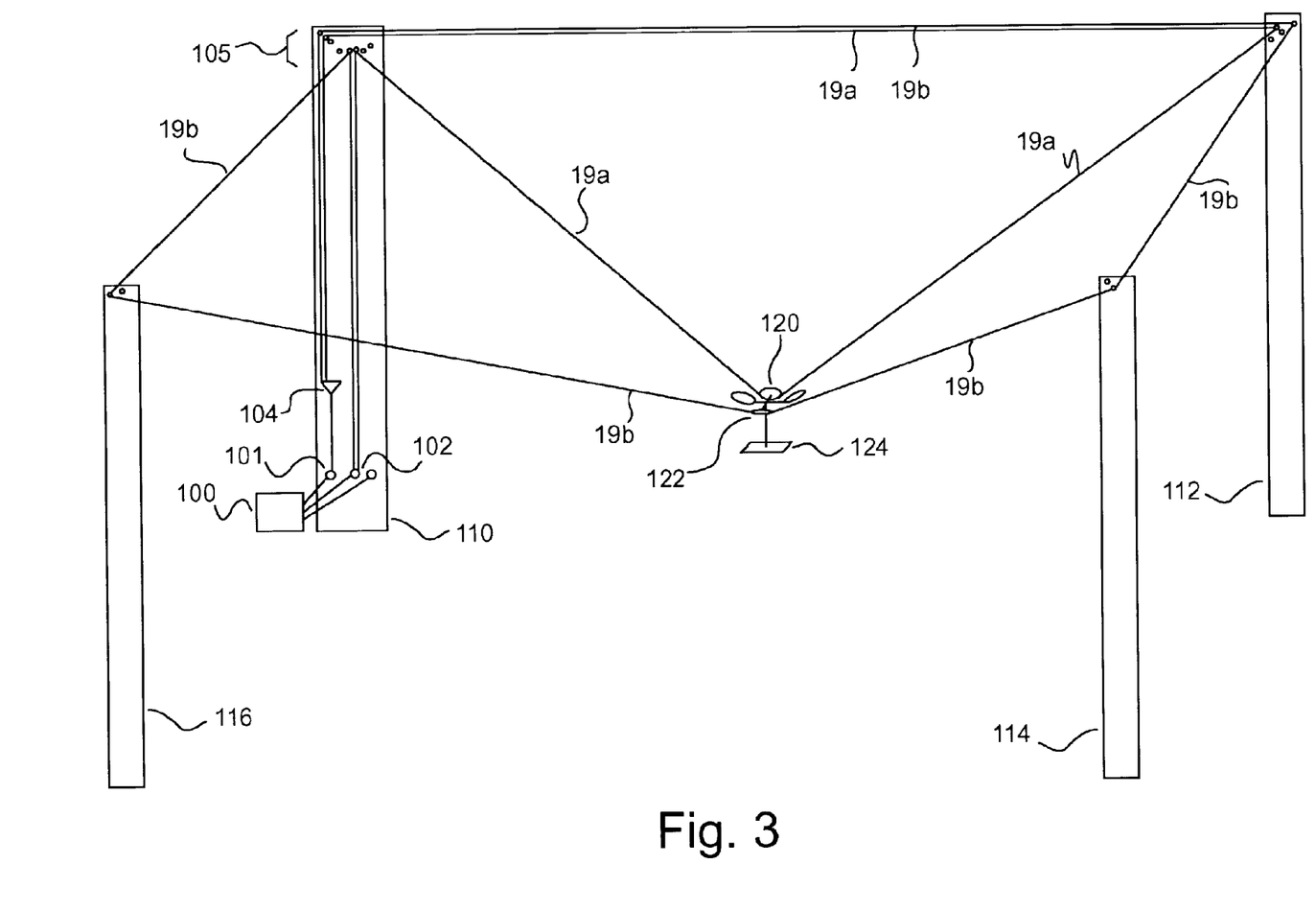
FIG. 3 is a perspective view of the Y-axis reeving.

FIG. 3 shows the Y-axis reeving. Y movement in the positive Y direction, into the figure, is accomplished by rotating Y-axis motor 102 clockwise in the diagram. As Y-axis motor 102 rotates clockwise, rope 19a moves down support structure 110 from sheave assembly 105 and out of sheave 120. As the rope leaves sheave 120 to support structure 110, it pulls platform 124 into the figure, in the positive Y-axis direction. At the same time, Y movement rope side 19b flows upward from,Y-axis motor 102 to sheave assembly 105 to support structure 116 and into sheave 122. Since the length of Y movement rope side 19a on the top side of platform 124 is decreasing in length while the length of Y movement rope side 19b on the bottom side of platform 124 is increasing, the platform moves into the figure, in the positive Y-axis direction. Note that the Y movement rope sides 19a and 19b between support structures 110 and 112 only move during Z-axis traversal. This is also true of rope 19b between support structures 112 and 114.

Unwinding rope attached between Z-axis motor 101 and Z movement device 104 increases the length of deployed rope in Y movement rope sides 19a and 19b. This lowers the platform in the Z-axis direction. As Z movement device 104 raises, Y movement rope side 19a and 19b moves upward into sheave assembly 105. Both rope sides travel to support structure 112. Y movement side 19a travels into sheave 120, and 19b travels to support structure 114 and into sheave 122. Since both sides of platform 124 have increased rope length, the platform lowers.

Figure 4:
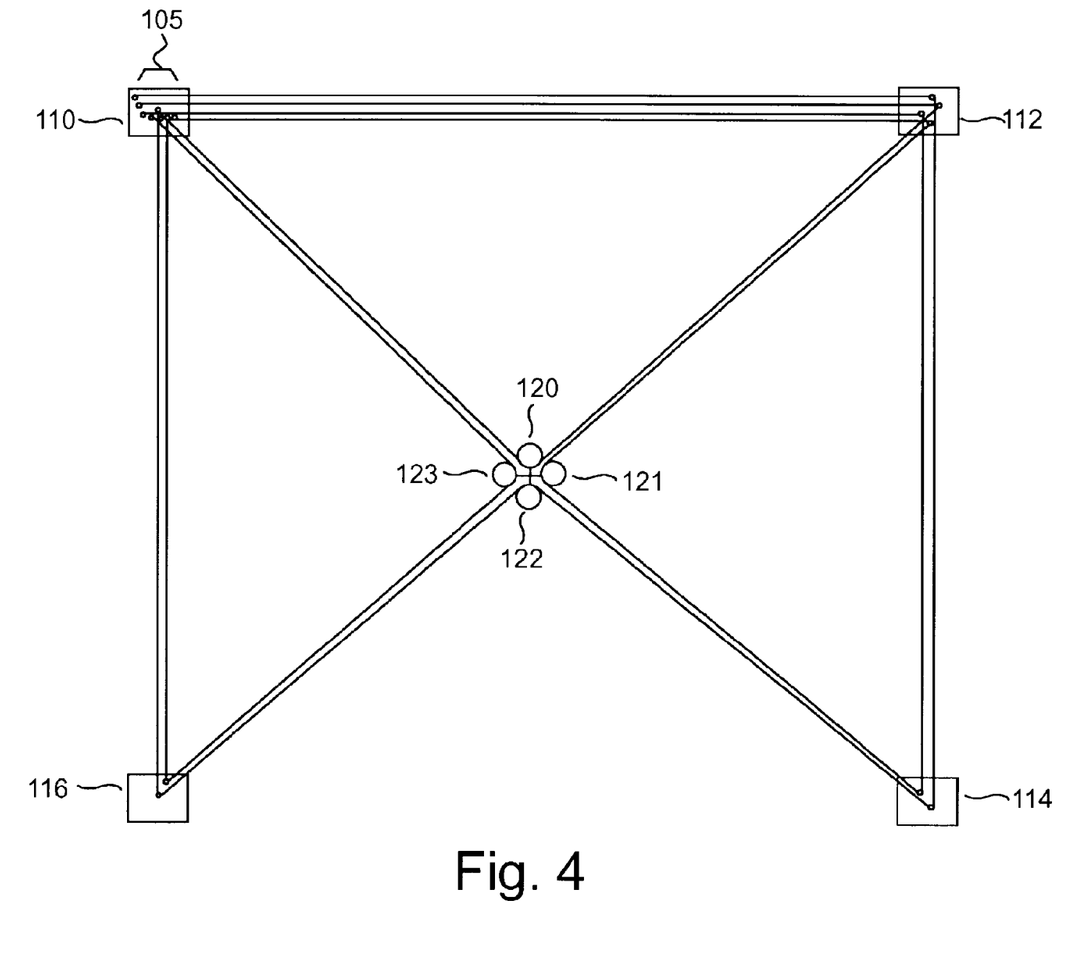
FIG. 4 is a top view of a rectangular embodiment of the system.

FIG. 4 shows a top view of an embodiment of the system in a rectangular configuration. Although sheave assembly 105 has been designated in the figure, each of the support structures has sheave assemblies of lesser complexity. Support structure 112 has four sheaves and support structures 114 and 116 have two sheaves. Each of the sheaves can consist of any device that can guide the rope into the sheave securely. Sheave assembly has 8 sheaves, four for Z-axis traversal, two for X-axis movement and two for Y-axis movement. See FIG. 10 for a close-up of support structure 110 and sheave assembly 105.

Figure 5:
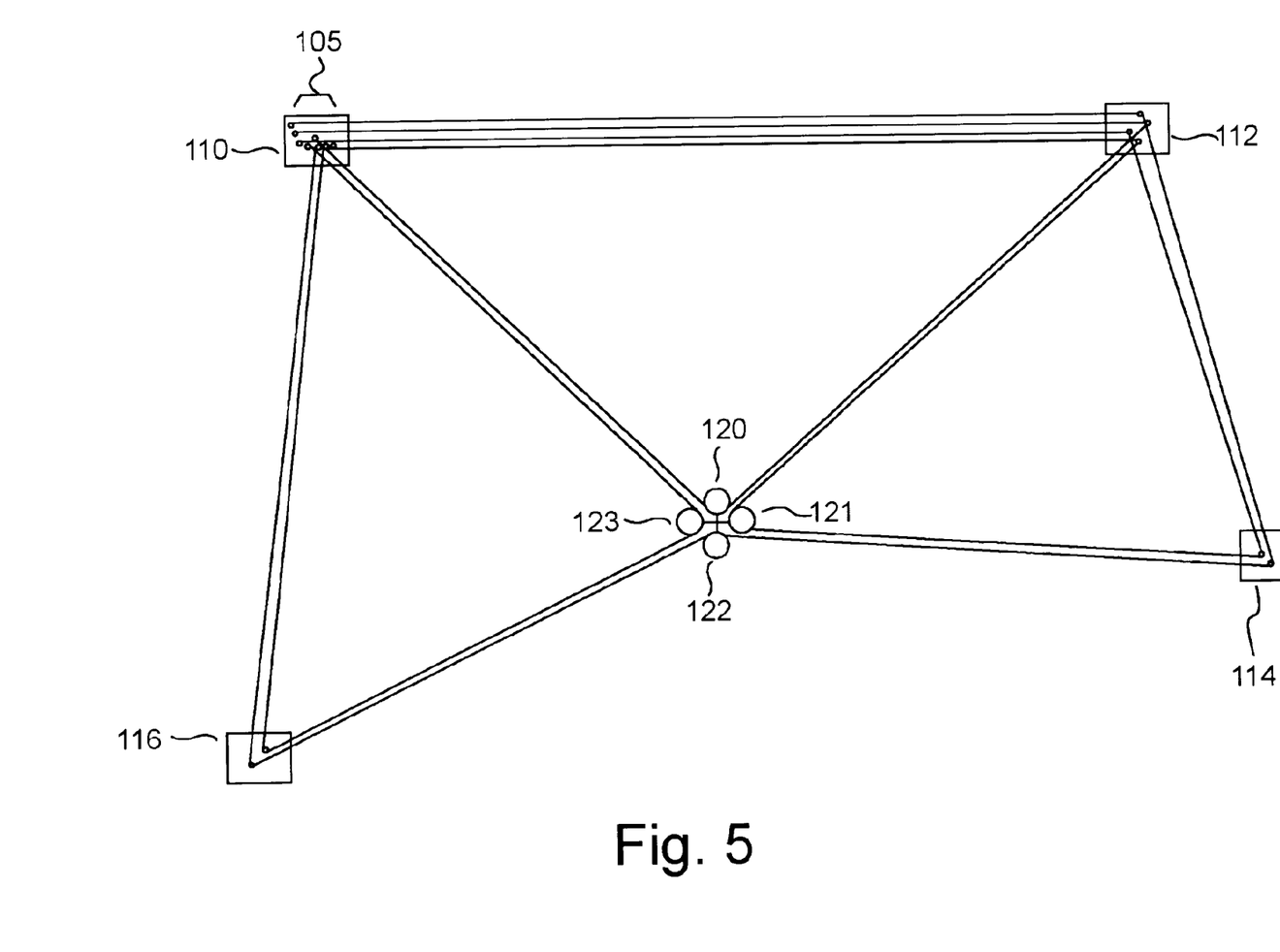
FIG. 5 is a top view of a quadrilateral embodiment of the system where no two sides have the same length.

FIG. 5 shows a non-rectangular embodiment of the system. In this embodiment, if lines were drawn between the four support structures 110 to 112, 112 to 114, 114 to 116 and 116 to 110, a convex quadrilateral would result. Concave quadrilateral embodiments may be configured by moving support structure 114 across a line drawn between support structure 112 and 116. Since the X-axis and Y-axis ropes are equal length for each stretch between support structures, it follows that the support structures may be moved without disabling the system although the overall length of the X and Y movement ropes would decrease unless support structures 116 and/or 112 were moved to take up the slack.

Figure 9:
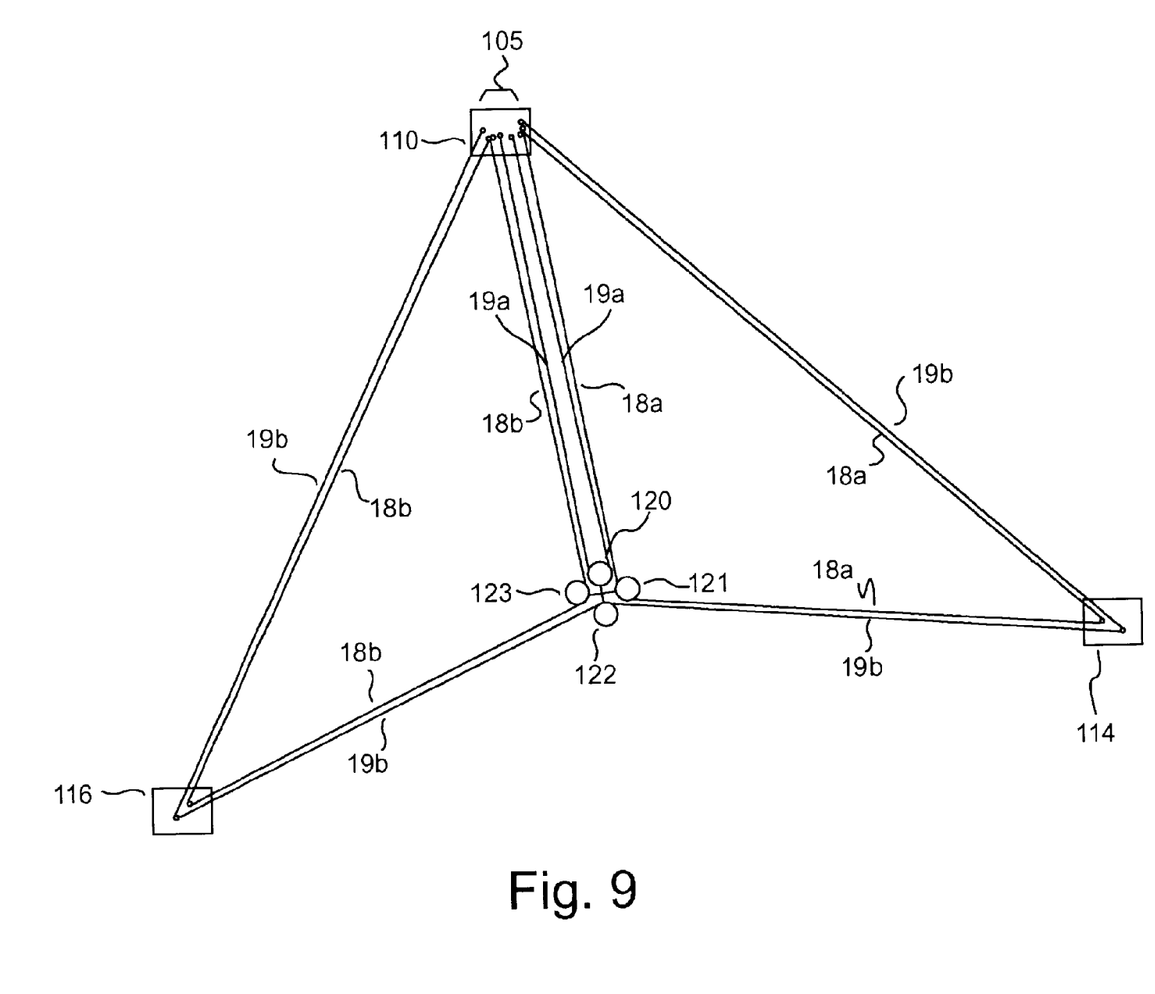
FIG. 9 is a top view of a scalene triangular embodiment of the system where no two sides have the same length.

FIG. 9 shows a triangular shape embodiment that is constructed with three support structures instead of four by eliminating support structure 112 and the four sheaves in it. The length between support structure 110 and 116 is the shortest, the length between support structures 110 and 114 is longer and the length between support structures 114 and 116 is the longest stretch. Since the three sides of the triangle are not of the same length a scalene triangle is formed although isosceles and equilateral triangular embodiments may also be constructed by placing the support structures at the required positions. Eliminating support structure 112 and the four sheaves in it accomplished by coupling sheave assembly 105 ropes to support structure 114 directly. Since the total lengths of the X and Y movement ropes are the same within the system, the same Z movement device may be utilized to raise and lower the platform. That area of coverage is a three sided triangle where no two sides are required to be of the same length.

Figure 6:
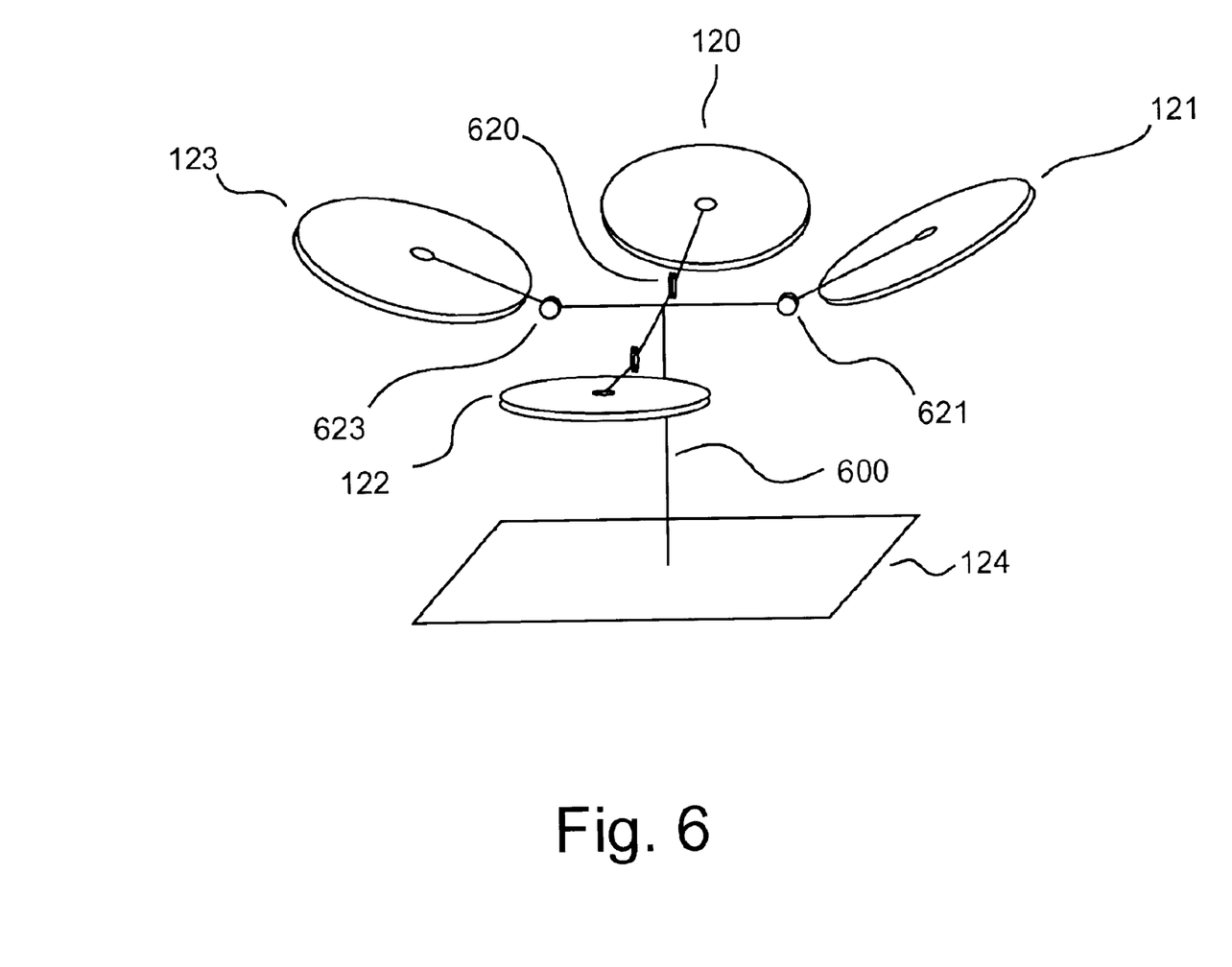
FIG. 6 is a perspective view of an embodiment of the platform.

FIG. 6 shows close up perspective of platform 124. This embodiment of the platform is suspended beneath the crossbar 601. Each of the sheaves 120, 121, 122 and 123 are hinged with universal joints. Sheave 120 is therefore hinged to crossbar 601 by universal joint 620. Platform 124 is suspended from crossbar 601 by platform post 600. Any useful device may be mounted on the platform.

Figure 7:
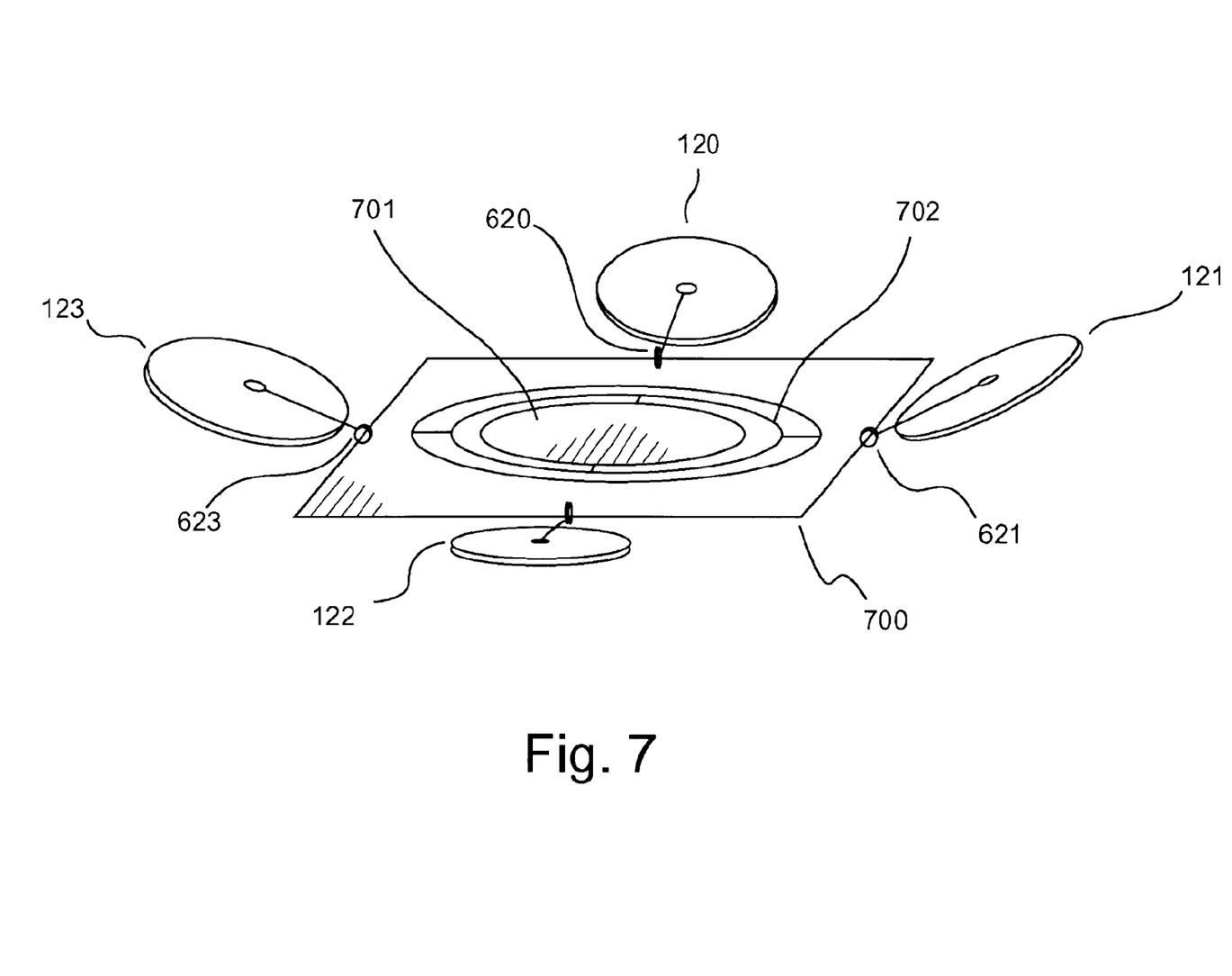
FIG. 7 is a perspective view of an embodiment of the platform.
Figure 11:
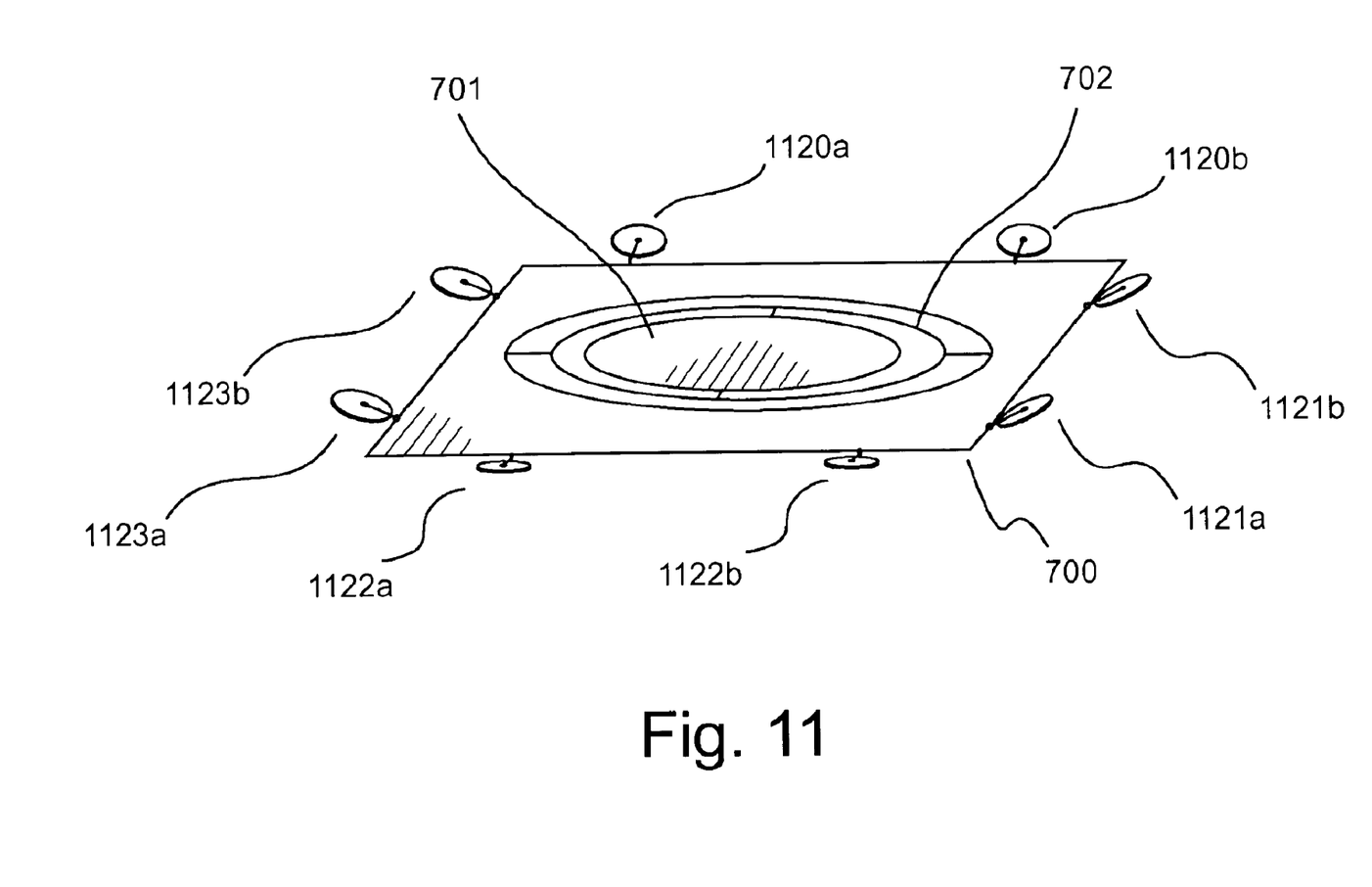
FIG. 11 is a perspective view of an embodiment of the platform employing two sheaves per side.

FIG. 7 shows a close up perspective of platform 700, another embodiment of a platform. This platform is supported by sheaves 120, 121, 122 and 123 via universal joints. Platform 700 contains two axis gimbal mount 702 with inner platform 701 which may support any useful device and may be remotely or actively tilted by wireless command. FIG. 11 shows a variation of FIG. 7 with two sheaves per side. Embodiments may employ sheaves of any number or any size on the platform.

Figure 8:
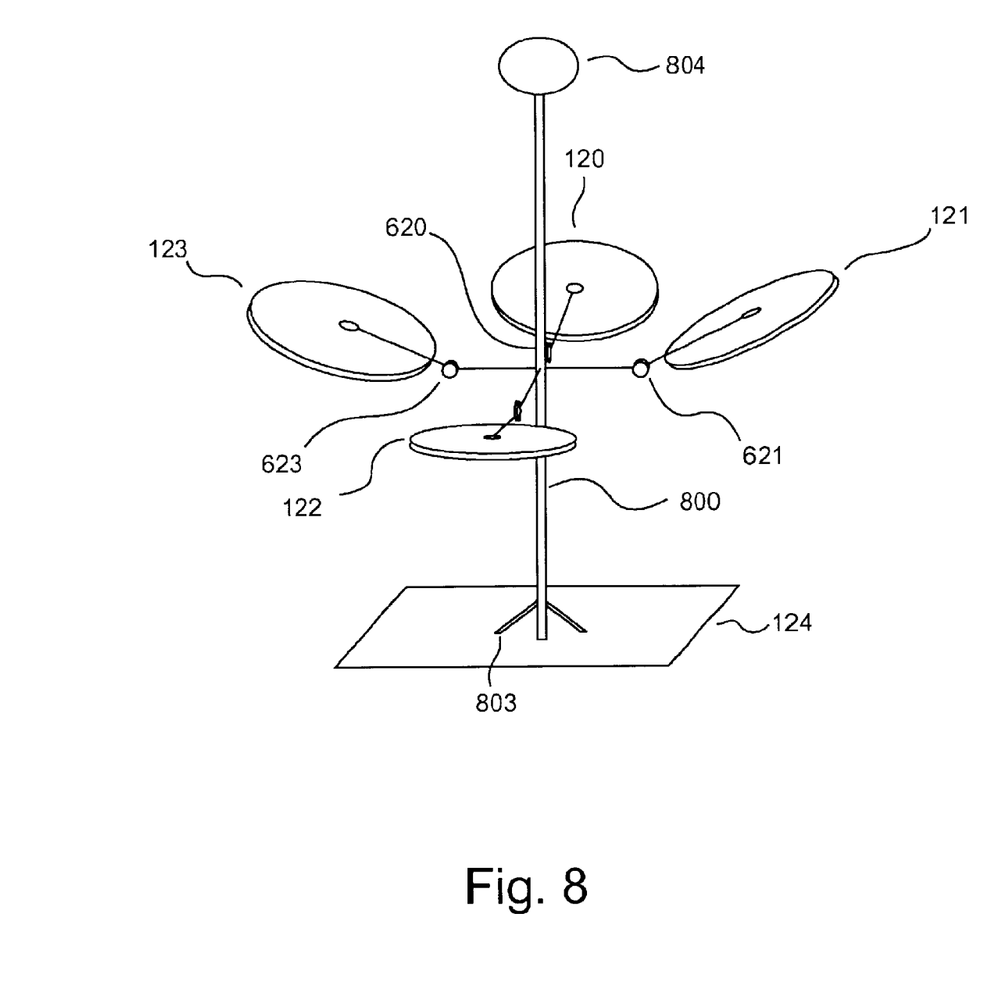
FIG. 8 is a perspective view of an embodiment of the platform utilizing a stabilized platform and counterweight.

FIG. 8 shows a close up perspective of platform 124 supported by an active stabilization system 803, supported by rod 800 with counterweight 804 at the top of rod 800. Many more platform embodiments are possible and the platforms shown in FIGS. 6, 7, 8 and 11 are merely a small set of examples of the myriad array of configurations possible. Since the X and Y movement ropes support platform 124 from upward angles on each of the platforms sides, there is no need for a tag line or gimbal assembly to provide further stabilization although embodiments of the invention may utilize any such device.

FIG. 1 shows an embodiments of the invention that uses single sheaves at all rope direction points. Other embodiments may use multiple sheave arrangements virtually anywhere where a single sheave is used in order to change direction of a rope and further prevent derailing. Sheaves with groove shapes and rounded edges that minimize the lateral friction on ropes passing through the sheaves may be utilized in order to minimize the amount of wasted power in the system. Embodiments of the invention may use any type of sheave that works with the rope specified for the system.

Any linear connection device may be utilized in place of rope, such as but not limited to cable. A dynamometer may be inserted in-line between Z-axis motor 101 and Z movement device 104 in order to provide tension readings.

An embodiment of the invention contains a simple block and tackle fitted between the Z movement device 104 and sheave assembly 105 in order to provide a Z-axis N-factor multiplier. This allows a multiplication factor to be calculated by determining the total amount of rope that each side of the block and tackle assembly contains and dividing the amount of rope on the sheave side by the amount of rope extendable from Z-axis motor 101. For example, if there were two pulleys on the sheave side with corresponding mounted pulley and terminator on the sheave side, and one pulley on the Z-axis motor 101 side, the multiplication factor would be 2. This would allow platform 124 to descend to two times the height of support structure 110. Increasing the number of sheaves looped through on one side or the other of the block alters the multiplication factor accordingly. In addition, if the rope attached to the Z movement device 104, the furthest that the platform 124 would fall would be the amount of rope on the sheave side, in this case two times the height of the support structure.

Platform 124 can have many different apparatus attached to it to perform a variety of functions including but not limited to stabilization devices, gimbals, camera equipment, mining loaders, ship-to-ship loaders, logging devices, ski lifts seats, gondolas, body sensing flight simulator suits for allowing a person to simulate flying, reduced gravity simulator suits, lifting harnesses, munitions depot bomb retrievers, digital video equipment for security checks in railroad yards or nuclear facilities, robotic agricultural harvest pickers for quickly picking and storing grapes or other produce or any other device that benefits from repeatable placement and motion in three dimensional space. In another embodiment, platform 124 comprises a witness camera mounted pointing down from the platform, providing a picture from the viewpoint of the platform.

What is claimed is:

1. A system comprising:
   a platform;
   an X movement rope configured to move said platform;
   a Y movement rope configured to move said platform; and,
   a Z movement device configured to move said X movement rope and said Y movement rope.

2. The system of claim 1 further comprising a plurality of sheaves through which said X movement rope and said Y movement rope travel.

3. The system of claim 1 further comprising:
   an X movement motor coupled with said X movement rope;
   a Y movement motor coupled with said Y movement rope; and,
   a Z movement motor coupled with said Z movement device.

4. The system of claim 3 further comprising an electrical generator and electronic drive units coupled to said X movement motor and said Y movement motor and said Z movement motor.

5. The system of claim 1 further comprising a dynamometer for measuring the tension of said Z movement device.

6. The system of claim 1 further comprising a stabilizer mounted on said platform.

7. The system of claim 1 wherein said platform is coupled with a camera mount.

8. The system of claim 1 wherein said platform is coupled with a mechanical claw.

9. The system of claim 1 wherein said platform is coupled with a hoist or loader.

10. The system of claim 1 wherein said platform is coupled with a mining scoop.

11. The system of claim 1 wherein said platform further comprises a downward pointing camera for remotely viewing from the position of said platform.

12. The system of claim 1 wherein said platform is attached to a flight simulating suit.

13. The system of claim 1 further comprising at least three support structures.

14. A method comprising:
    coupling an X movement rope to a platform;
    coupling a Y movement rope to said platform; and,
    coupling a Z movement device to said X movement rope and said Y movement rope.

15. The method according to claim 14 further comprising:
    coupling said X movement rope to an X movement motor;
    coupling said Y movement rope to a Y movement motor; and,
    coupling said Z movement device to a Z movement motor.

16. The method according to claim 15 further comprising:
    rotating said X movement motor;
    rotating said Y movement motor;
    rotating said Z movement motor; and, moving said platform.

17. A system comprising:
    means for coupling an X movement rope to a platform;
    means for coupling a Y movement rope to said platform; and,
    means for coupling a Z movement device to said X movement rope and said Y movement rope.

18. The system of claim 17 further comprising:
    means for coupling said X movement rope to an X movement motor;
    means for coupling said Y movement rope to a Y movement motor; and
    means for coupling said Z movement device to a Z movement motor.

19. The system of claim 18 further comprising:
    means for rotating said X movement motor;
    means for rotating said Y movement motor; and,
    means for rotating said Z movement motor.

20. The system of claim 19 further comprising:
    means for stabilizing said platform.

* * * * *